United States Patent
Ikeda et al.

(10) Patent No.: US 7,417,990 B2
(45) Date of Patent: Aug. 26, 2008

(54) LAYER 2 SWITCH

(75) Inventors: Koji Ikeda, Fujisawa (JP); Hiroaki Miyata, Yokohama (JP); Migaku Ota, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 623 days.

(21) Appl. No.: 11/178,512

(22) Filed: Jul. 12, 2005

(65) Prior Publication Data

US 2006/0072572 A1    Apr. 6, 2006

(30) Foreign Application Priority Data

Oct. 5, 2004    (JP)    ............... 2004-292355

(51) Int. Cl.
*H04L 12/28*    (2006.01)
(52) U.S. Cl. .................. 370/390; 370/432; 370/401
(58) Field of Classification Search .............. None
See application file for complete search history.

(56) References Cited

U.S. PATENT DOCUMENTS

| | | | |
|---|---|---|---|
| 6,169,741 B1* | 1/2001 | LeMaire et al. | 370/401 |
| 6,751,218 B1* | 6/2004 | Hagirahim et al. | 370/390 |
| 6,847,638 B1* | 1/2005 | Wu et al. | 370/389 |
| 2002/0071442 A1* | 6/2002 | Li | 370/432 |
| 2004/0100983 A1* | 5/2004 | Suzuki | 370/432 |
| 2004/0190514 A1* | 9/2004 | Uchiyama et al. | 370/390 |
| 2004/0258003 A1* | 12/2004 | Kokot et al. | 370/254 |
| 2005/0220132 A1* | 10/2005 | Oman et al. | 370/432 |
| 2006/0007930 A1* | 1/2006 | Dorenbosch | 370/390 |
| 2006/0045085 A1* | 3/2006 | He | 370/390 |
| 2006/0146823 A1* | 7/2006 | Ding | 370/390 |

FOREIGN PATENT DOCUMENTS

| | | |
|---|---|---|
| JP | 2003-032287 | 1/2003 |
| JP | 2003-069639 | 3/2003 |
| JP | 2003-152796 | 5/2003 |
| JP | 2003-348148 | 12/2003 |

OTHER PUBLICATIONS

"Host Extensions for IP Multicasting" by S. Deering, Stanford University, Aug. 1989, pp. 1-17.
Internet Group Management Protocol, Version 2, by W. Fenner, Xerox Parc, Nov. 1997, pp. 1-24.
"Multicast Listener Discovery (MLD) for IPv6" by S. Deering et al, Oct. 1999, pp. 1-22.

* cited by examiner

*Primary Examiner*—Bob A Phunkulh
(74) *Attorney, Agent, or Firm*—Mattingly, Stanger, Malur & Brundidge, P.C.

(57) ABSTRACT

A Layer 2 switch manages distribution destinations of a multicast packet and distributes a copy of the multicast packet, so that the bandwidth wasted in a network is reduced. The Layer 2 switch is disposed between a user terminal and a packet transfer apparatus, which are connected by P2P, has a function to manage connected multicast users, receives a multicast packet on behalf of the users, and distributes a copy, to reduce the bandwidth wasted between the Layer 2 switch and the packet transfer apparatus.

8 Claims, 10 Drawing Sheets

| GROUP ADDRESS | CHANNEL INTERFACE NUMBER | CHANNEL TYPE | SessionID | VPI | VCI | tagID | TERMINAL MAC ADDRESS |
|---|---|---|---|---|---|---|---|
| 224.10.10.10 | 1 | PPPoE | 10 | — | — | — | 00-00-87-00-00-01 |
| 224.10.10.10 | 2 | PPPoE | 20 | — | — | — | 00-00-87-00-00-02 |
|  |  |  |  |  |  |  |  |

←search key→

| GROUP ADDRESS | CHANNEL INTERFACE NUMBER | CHANNEL TYPE | SessionID | VPI | VCI | tagID | PACKET TRANSFER APPARATUS MAC ADDRESS |
|---|---|---|---|---|---|---|---|
| 224.10.10.10 | 3 | PPPoE | 30 | — | — | — | 00-00-87-00-00-10 |
|  |  |  |  |  |  |  |  |
|  |  |  |  |  |  |  |  |

←search key→

MULTICAST PACKET RECEIVED FROM PACKET TRANSFER APPARATUS

MULTICAST PACKET COPIED AND DISTRIBUTED TO USER TERMINAL H1-1

MULTICAST PACKET COPIED AND DISTRIBUTED TO USER TERMINAL H1-2

LAYER 2 SWITCH

BACKGROUND OF THE INVENTION

1. Field of the Invention

The present invention relates to Layer 2 switches, and more specifically, to a Layer 2 switch for copying a multicast packet, in multicast packet transfer used for content information distribution such as broadcasting.

2. Description of the Related Art

In the initial stage of the spread of the Internet among the general public, Internet access was obtained in most cases by a direct dial-up connection to an access point of an Internet service provider (ISP) and authentication. A commonly used protocol is Point-to-Point Protocol (PPP), which supports an authentication function and a compression function. PPP is a Layer-2-class protocol for making a one-to-one connection between a user terminal and an ISP access point. In this age of broadband, a connection by an access carrier network using Internet Protocol (IP) has become the mainstream of connection between a user terminal and an ISP, instead of a connection by a telephone network. Layer-1 protocols such as Ethernet (registered trademark) and Asynchronous Transfer Mode (ATM) are used in the access carrier network. For these n-to-n protocols, PPP, which was originally developed for one-to-one authentication, cannot be used directly. PPP on Ethernet (registered trademark (PPPoE) and PPP on ATM (PPPoA) have been developed for those applications.

As broadband networks have advanced, multicast technologies for broadcasting and other content distribution have also been receiving attention. The conventional multicast technologies utilizing IP include an IP multicast method and a PPP multicast method. Efficient information distribution can be conducted by using an IP-multicast router or an IP-multicast access server for implementing a broadcast service on an IP network built for communication. As technologies for multicast communication for distributing data to a plurality of specific destinations, the Internet Engineering Task Force (IETF) has standardized TCP/IP details in Internet Group Membership Protocol (IGMP: RFC 1112, chapter 4, chapter 7, appendix 1 (non-patent document 1), RFC 2236, chapter 2, chapter 3, chapter 6, chapter 7 (non-patent document 2)) for IPv4, and Multicast Listener Discovery (MLD: RFC 2710, chapter 3, chapter 4, chapter 5, chapter 6 (non-patent document 3) for IPv6.

IGMP and MLD are used between a user terminal and a packet transfer apparatus (such as a gateway and a router). The protocols control a group of user terminals (a multicast group) made for receiving multicast distribution, which distributes identical data to a plurality of user terminals efficiently. IGMP and MLD are used when a user terminal makes a request to join a multicast group (multicast data distribution request) or when a user terminal makes a request to leave a multicast group (request to stop multicast data distribution). When a content distribution server distributes information in packets, by a request sent from a user terminal included in a multicast group, a content distribution service is performed as follows: A low-level packet transfer apparatus (such as a gateway or a router) receives the packet, makes as many copies of the packet as the number of user terminals included in the requesting multicast group, and transfers the copies to the user terminals. Copying a multicast packet by an apparatus closest to the user terminal is ideal for minimizing a network load in multicasting. Japanese Unexamined Patent Application Publication No. 2003-69639 (patent document 1) describes an x Digital Subscriber Line (xDSL) apparatus including a cache server and a method of storing received content data in the cache server of the xDSL apparatus on behalf of the clients and distributing data copied by the xDSL apparatus to each client. This method requires a large-capacity cache that can hold a moving image and other data. Japanese Unexamined Patent Application Publication Nos. 2003-32287 (patent document 2), 2003-348148 (patent document 3), and 2003-152796 (patent document 4), and others are also known to the public.

In a general access carrier network, a user terminal is generally connected to a broadband access server (BAS) for the purpose of authentication and further connected through a router of an ISP network to a content distribution server. In some other cases, a user terminal is connected to a Layer 2 Tunneling Protocol (L2TP) access concentrator (LAC) and further connected through an L2TP network server (LNS) to an ISP network. The BAS or LNS (hereafter referred to as a packet transfer apparatus) keeps track of user terminals connected to it by IGMP or MLD and performs multicast data distribution by making as many copies of each multicast packet received from the content distribution server as the number of user terminals and sending the copies at the same time.

If the packet transfer apparatus used in the network has a small number of ports, the user terminals may be connected by a Layer 2 switch, and the user terminals and the packet transfer apparatus may be connected by PPPoE, VLAN, and others. IGMP or MLD is used to keep track of the user terminals in this network as well, but IGMP or MLD gives layer information of IP or a higher level. A Layer 2 switch does not support packet processing of IP or a higher level and cannot keep track of the user terminals connected to it. Accordingly, a packet transfer apparatus supporting Layer 3 or above must be used to manage the user terminals and distributes packets to the user terminals connected to it. However, since a point-to-point (P2P) connection is used between the user terminal and the packet transfer apparatus, unicast communication performed for distribution to the user terminals would use up an n-fold bandwidth. So, a sufficient bandwidth must be reserved between the Layer 2 switch and BAS, resulting in a high cost.

SUMMARY OF THE INVENTION

Accordingly, it is an object of the present invention to minimize a bandwidth wasted between the Layer 2 switch and the packet transfer apparatus by managing the user terminals and implementing multicast copy distribution by means of the Layer 2 switch.

Another object of the present invention is to implement a multicast packet distribution function including multicast packet distribution destination management by the Layer 2 switch, by taking out an IGMP packet or an MLD packet sent from the user terminal selectively from a PPP connection. A further object of the present invention is to reduce the internal load of the access carrier network and suppress the equipment cost, by making a dynamic or static multicast connection between the Layer 2 switch and the packet transfer apparatus and letting the Layer 2 switch receive a multicast packet as a representative of the plurality of multicast user terminals connected to it.

A Layer 2 switch of the present invention has a snoop function to check the contents of a multicast packet and manages the user information of a multicast group. The Layer 2 switch also includes a termination means of IGMP packets or MLD packets sent from the user, so that the packet transfer apparatus will not make as many copies as the number of users of an IGMP packet or an MLD packet sent to the packet transfer apparatus, such as an IGMP join packet and an MLD join packet issued by the user to join a multicast group when multicast packet distribution is performed. A multicast connection is made, and the Layer 2 switch receives a multicast packet from the packet transfer apparatus through the connection. Multicast packet transfer is carried out through the multicast connection. According to the present invention, the Layer 2 switch including the means described above can solve the problems as described earlier. The apparatus of the present invention includes a plurality of channel interfaces, a channel interface control block, and a processor for performing packet analysis and editing, so that those means can be implemented. Memory holds a user management table for storing the information of a connected user terminal and a multicast connection management table for managing a multicast connection made to a packet transfer apparatus. An IGMP packet snoop function and an MLD packet snoop function to check a packet coming from the user, an IGMP packet termination function and an MLD packet termination function to terminate a packet coming from the user, a function to make a multicast connection to a packet transfer apparatus, a multicast packet copy function, and a header edit function are provided.

The conventional Layer 2 switch cannot perform multicast packet distribution together with multicast packet distribution destination management. A Layer 2 switch of the present invention can implement multicast packet distribution involving multicast packet distribution destination management by taking out an IGMP packet or an MLD packet coming from the user selectively from a PPP connection. A dynamic or static multicast connection is made between the Layer 2 switch and a packet transfer apparatus, and the Layer 2 switch receives a multicast packet as a representative of the plurality of multicast user terminals connected to it, so that the internal load of the access carrier network can be minimized and the facility cost can be reduced.

According to the solving means of the invention, there is provided a Layer 2 switch disposed between a user terminal and a packet transfer apparatus, for passing a packet, the Layer 2 switch comprising:

a user management table for storing an address of a multicast group which the user terminal is going to join, a channel interface number connected to the user terminal, and a MAC address of the user terminal;

a multicast connection management table for storing a channel interface number of a multicast connection to be made to the packet transfer apparatus and a MAC address of the packet transfer apparatus, corresponding to an address of a multicast group which the user terminal is going to join;

a channel interface connected to a network; and a processor which has access to each of the tables and transfers a multicast packet between the user terminal and the packet transfer apparatus through the channel interface;

the processor comprising:

a means for receiving a packet of a multicast reception request message for joining a multicast group having a multicast group address, from a user terminal desiring to receive a multicast packet through the channel interface;

a means for terminating the received packet without transferring the packet to the packet transfer apparatus of high-level if it is judged from the header or the data portion that the packet from a user terminal contains a multicast reception request message;

a means for determining whether a multicast connection has already been made, in accordance with a multicast group address obtained from the received multicast reception request message, with reference to the multicast connection management table;

a means for adding a multicast group address and a channel interface number and a MAC address of a user terminal from which the multicast reception request message is sent, if the multicast reception connection has already been made;

a means for receiving a multicast packet from the packet transfer apparatus and determining whether the multicast packet is received through the multicast connection, with reference to the multicast connection management table, in accordance with a multicast group address and a transmission source MAC address included in the received packet;

a means for referencing the user management table in accordance with a group address included in the received packet, if the received packet is determined as being a multicast packet; and a means for copying the multicast packet for each contained user terminal while obtaining the information of a channel interface to each user terminal from the user management table, and distributing the multicast packet to each user terminal, if the user management table contains the information of a user terminal joining a group having the same group address as included in the received packet.

DESCRIPTION OF THE PREFERRED EMBODIMENTS

An embodiment of the present invention will be described below with reference to the drawings. The embodiment uses IPv4 IGMP. An embodiment using IPv6 MLD will not be described because the basic operation is similar to that described here. The present invention and embodiment can be applied to another multicast data distribution method or another protocol.

1. Hardware Configuration

Figure 1:
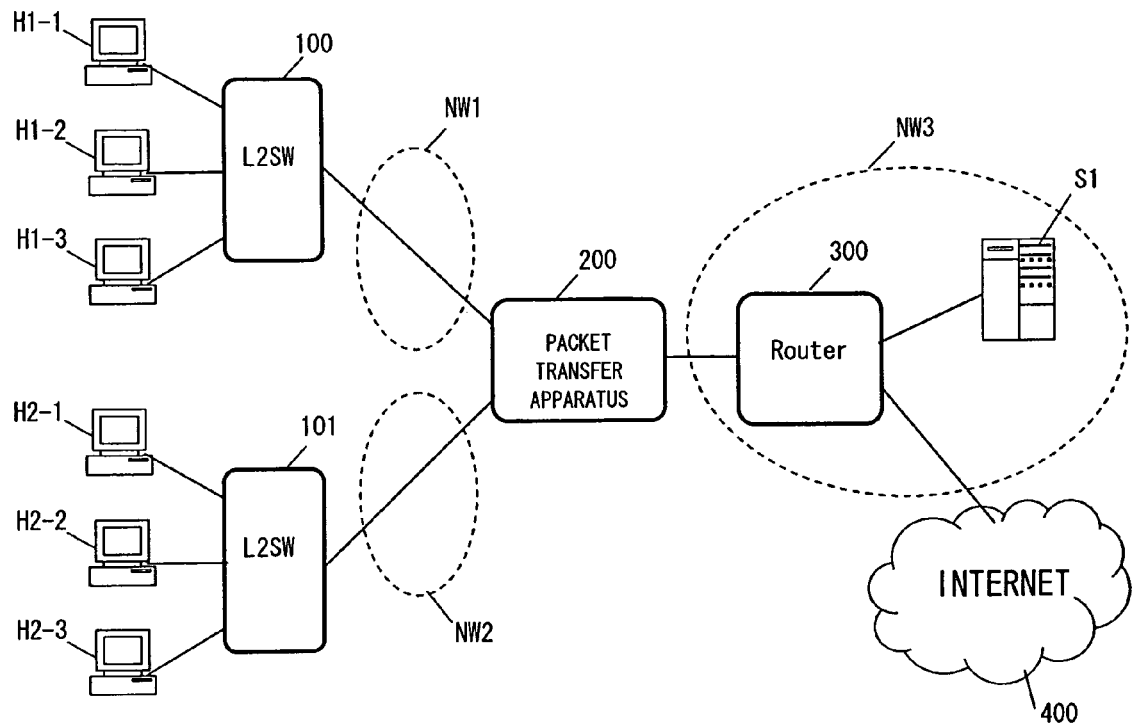
FIG. 1 shows an example configuration of a network of an embodiment.

FIG. 1 shows an example configuration of a network to which the present invention is applied.

User terminals H1-i and H2-i are connected to Layer 2 switches 100 and 101 respectively and then connected through access carrier networks NW1 and NW2 respectively to a packet transfer apparatus 200. The packet transfer apparatus is generally a BAS or LAC-LNS. The packet transfer apparatus is connected through a router 300 in an ISP network NW3 to the Internet 400 and to a content distribution server S1. The connections between the user terminals H1-i and H2-i and the packet transfer apparatus 200 are made by PPPoE, PPPoA, VLAN, and others.

Figure 2:
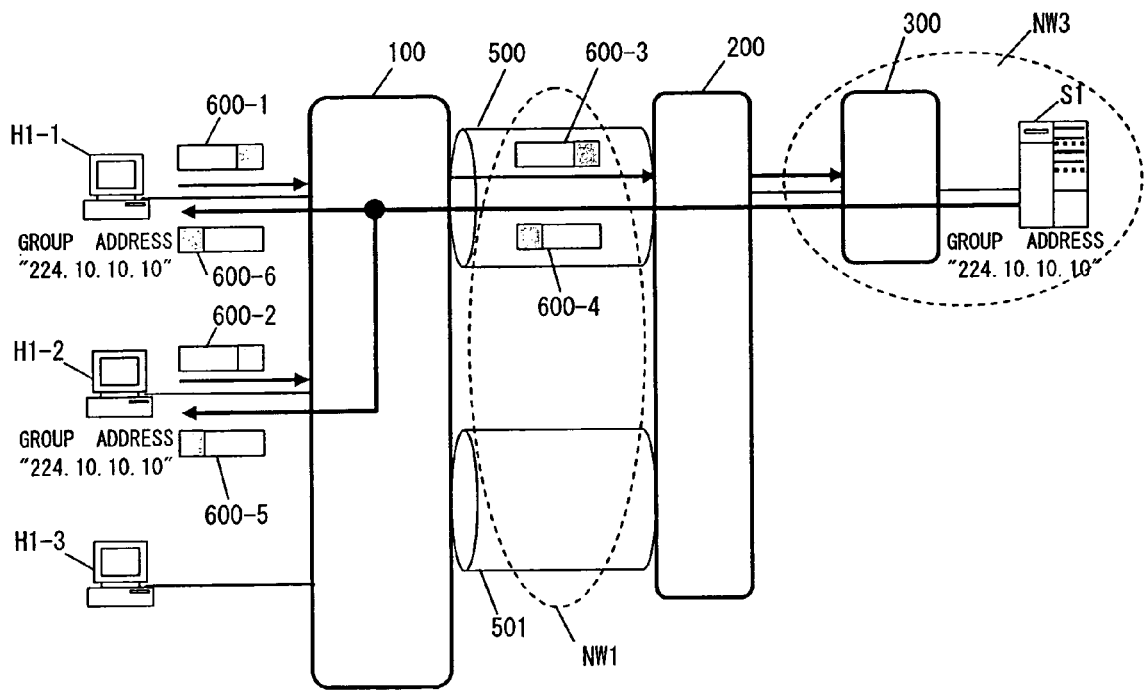
FIG. 2 shows the flow of a multicast packet in the embodiment.

FIG. 2 shows the flow of an IGMP packet and a multicast packet.

The user terminals H1-1 and H1-2 have already subscribed to a content distribution agent and have a right to join a multicast group having group address "224.10.10.10". The user terminal H1-3 has not yet subscribed and does not have a right to join the multicast group having group address "224.10.10.10". The user terminals H1-1 and H1-2, having a right to join the multicast group having group address "224.10.10.10", indicate their intention to join or leave the multicast group having group address "224.10.10.10", by sending IGMP packets 600-1 and 600-2 respectively to the Layer 2 switch. The Layer 2 switch establishes a multicast connection 500 on the access carrier network NW1 and sends an IGMP packet 600-3 to the packet transfer apparatus on behalf of the user terminals H1-1 and H1-2. Their intention to join or leave the multicast group having group address "224.10.10.10" is transferred through the router 300 to the content distribution server S1.

A multicast packet distributed from the content distribution server S1 is transferred in the inverse route. The content distribution server S1 sends a multicast packet 600-4 via the router 300 and the packet transfer apparatus 200 to the Layer 2 switch. The Layer 2 switch makes copies 600-5 and 600-6 and sends the copies to the user terminals H1-1 and H1-2.

Figures 3, 4:
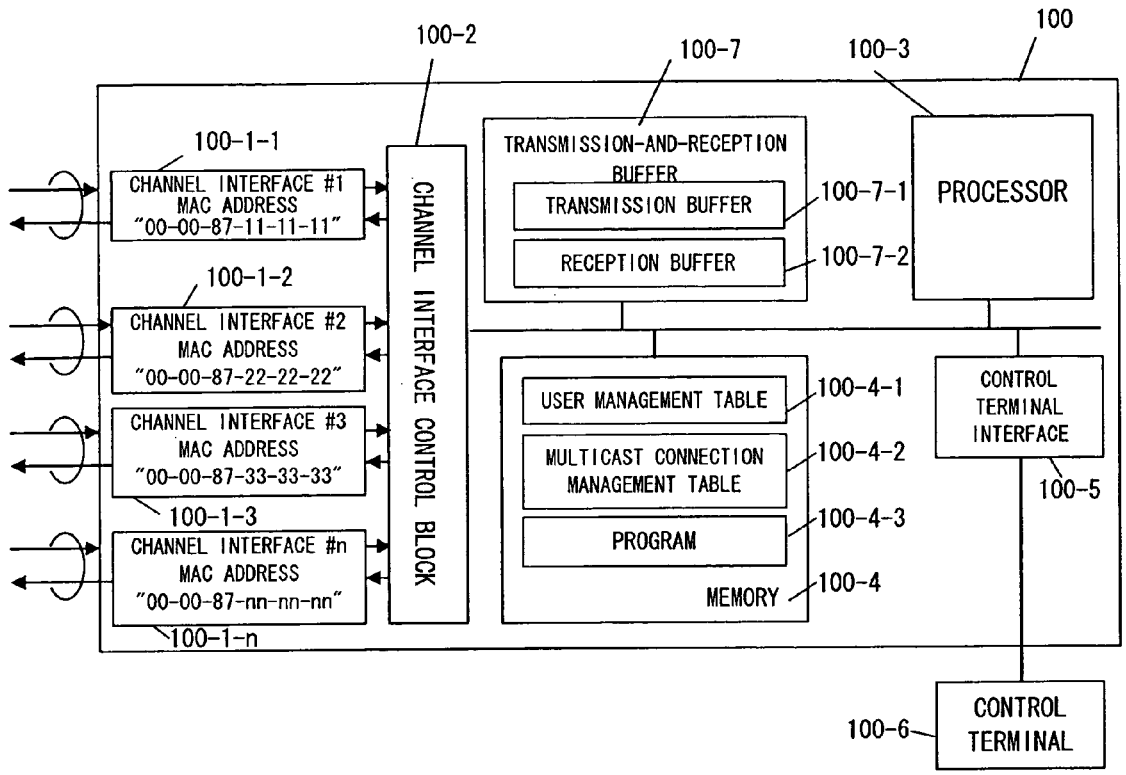
FIG. 3 shows an internal configuration of a Layer 2 switch of the present invention.
FIG. 4 shows a configuration of a user management table.

FIG. 3 shows the internal configuration of the Layer 2 switch 100 of the embodiment.

The Layer 2 switch includes a plurality of channel interfaces 100-1-i for input and output channels, a channel interface control block 100-2, a processor 100-3, a memory 100-4, a control terminal interface 100-5, and a transmission-and-reception buffer 100-7. The channel interface control block 100-2 controls the channel interfaces 100-1-i. The processor 100-3 performs packet analysis, editing, and other processing by using the memory 100-4. The control terminal interface 100-5 interfaces with an external control terminal 100-6. The transmission-and-reception buffer 100-7 temporarily stores a packet sent or received through the channel interface 100-1-i. The memory 100-4 stores a program 100-4-3 to be executed by the processor, a user management table 100-4-1 for managing connected multicast users, and a multicast connection management table 100-4-2 for managing multicast connections made to the packet transfer apparatus 200. The transmission-and-reception buffer 100-7 includes a transmission buffer 100-7-1 and a reception buffer 100-7-2.

The channel interface 100-1-i restores an IP packet from a signal received from an IP network, transfers the IP packet to the channel interface control block 100-2, and sends an output IP packet received from the channel interface control block to the IP network in a communication frame format matching the communication protocol of an input or output channel, such as Ethernet (registered trademark) and ATM. Each channel interface 100-1-i has a separate MAC address. In the shown embodiment, the channel interface #1 100-1-1 has a MAC address of 00-00-87-11-11-11; the channel interface #2 100-1-2 has a MAC address of 00-00-87-22-22-22; the channel interface #3 100-1-3 has a MAC address of 00-00-87-33-33-33.

Figures 5, 6, 7:
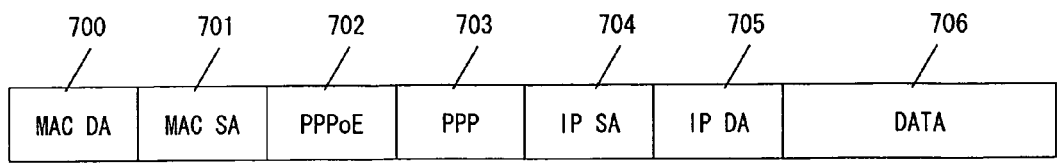
FIG. 5 shows a configuration of the user management table.
FIG. 6 shows a configuration of a multicast connection management table.
FIG. 7 shows the configuration of a packet transferred between a user terminal and a packet transfer apparatus.

FIG. 4 and FIG. 5 show the user management table 100-4-1.

The user management table 100-4-1 manages the connection information of the user terminal H1-i connected to the Layer 2 switch 100, such as the multicast group to which the user terminal belongs and the channel type. The user management table 100-4-1 includes these fields: multicast group address 100-4-1-1, channel interface number 100-4-1-2, channel type 100-4-1-3, session ID 100-4-1-4, VPI 100-4-1-5, VCI 100-4-1-6, tag ID 100-4-1-7, and terminal MAC address 100-4-1-8. The session ID field 100-4-1-4 is used just when the channel type is PPPoE. Otherwise, the session ID field is set to "don't care". The VPI field 100-4-1-5 and the VCI field 100-4-1-6 are used just when the channel type is PPPoA. Otherwise, the VIP and VCI fields are set to "don't care". The tag ID field 100-4-1-7 is used just when the channel type is VLAN. Otherwise, the tag ID field is set to "don't care". If the user management table 100-4-1 contains no data, the Layer 2 switch 100 has no multicast user terminals.

FIG. 4 shows that one user terminal is connected by PPPoE. FIG. 5 shows that one more user terminal joins the multicast group.

FIG. 6 shows the multicast connection management table 100-4-2.

The multicast connection management table 100-4-2 manages which multicast group data is received through which connection from the packet transfer apparatus. The multicast connection management table includes these fields: multicast group address 100-4-2-1, channel interface number 100-4-2-2, channel type 100-4-2-3, session ID 100-4-2-4, VPI 100-4-2-5, VCI 100-4-2-6, tag ID 100-4-2-7, and packet transfer apparatus MAC address 100-4-2-8. The session ID field 100-4-2-4 is used just when the channel type is PPPoE. Otherwise, the session ID field is set to "don't care". The VPI field 100-4-2-5 and the VCI field 100-4-2-6 are used just when the channel type is PPPoA. Otherwise, the VPI and VCI fields are set to "don't care". The tag ID field 100-4-2-7 is used just when the channel type is VLAN. Otherwise, the tag ID field is set to "don't care". If the multicast connection management table 100-4-2 contains no data, no multicast connection is made to the packet transfer apparatus 200.

FIG. 7 shows the configuration of a packet 600-i transferred between the user terminal H1-i and the packet transfer apparatus 200.

The packet 600-i transferred between the user terminal H1-i and the packet transfer apparatus 200 includes a MAC DA field 700, a MAC SA field 701, a PPPoE header information field 702, a PPP header information field 703, an IP SA field 704, an IP DA field 705, and a data field 706. The MAC DA field 700 contains the physical address of the transmission destination. The MAC SA field 701 contains the physical address of the transmission source. The IP SA field 704 contains the IP address of the transmission source. The IP DA field 705 contains the IP address of the transmission destination.

Figure 8:
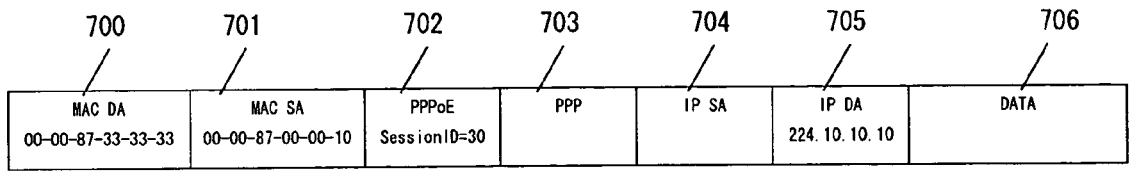
FIG. 8 shows an example of a multicast packet which the Layer 2 switch receives from the packet transfer apparatus.
Figure 9:
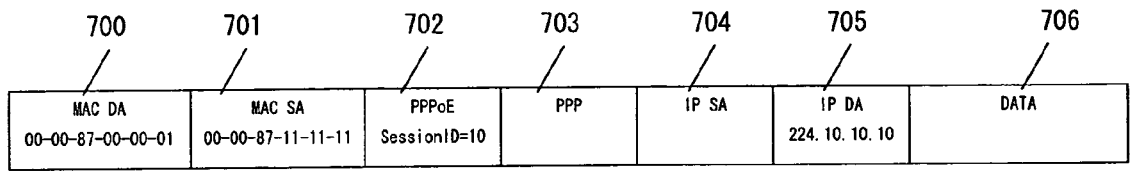
FIG. 9 shows an example of a multicast packet copied by the Layer 2 switch and transferred to a user terminal.
Figure 10:
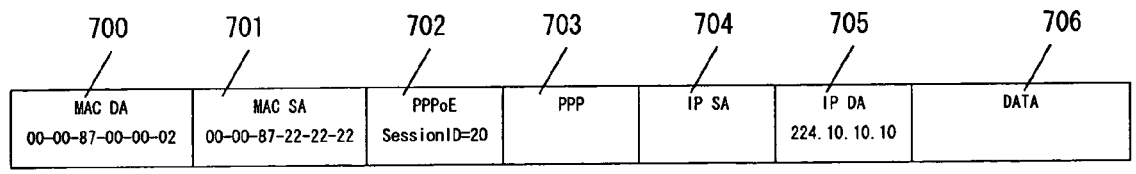
FIG. 10 shows an example of a multicast packet copied by the Layer 2 switch and transferred to a user terminal.

FIG. 8 shows an example of a multicast packet 600-4 transferred from the packet transfer apparatus to the Layer 2 switch. FIG. 9 shows an example of a multicast packet 600-6 copied by the Layer 2 switch and transferred to the terminal H1-1. FIG. 10 shows an example of a multicast packet 600-5 copied by the Layer 2 switch and transferred to the terminal H1-2. In FIGS. 8, 9, and 10, the IP DA field 705 contains the multicast group address "224.10.10.10".

2. Operation

Figure 11:
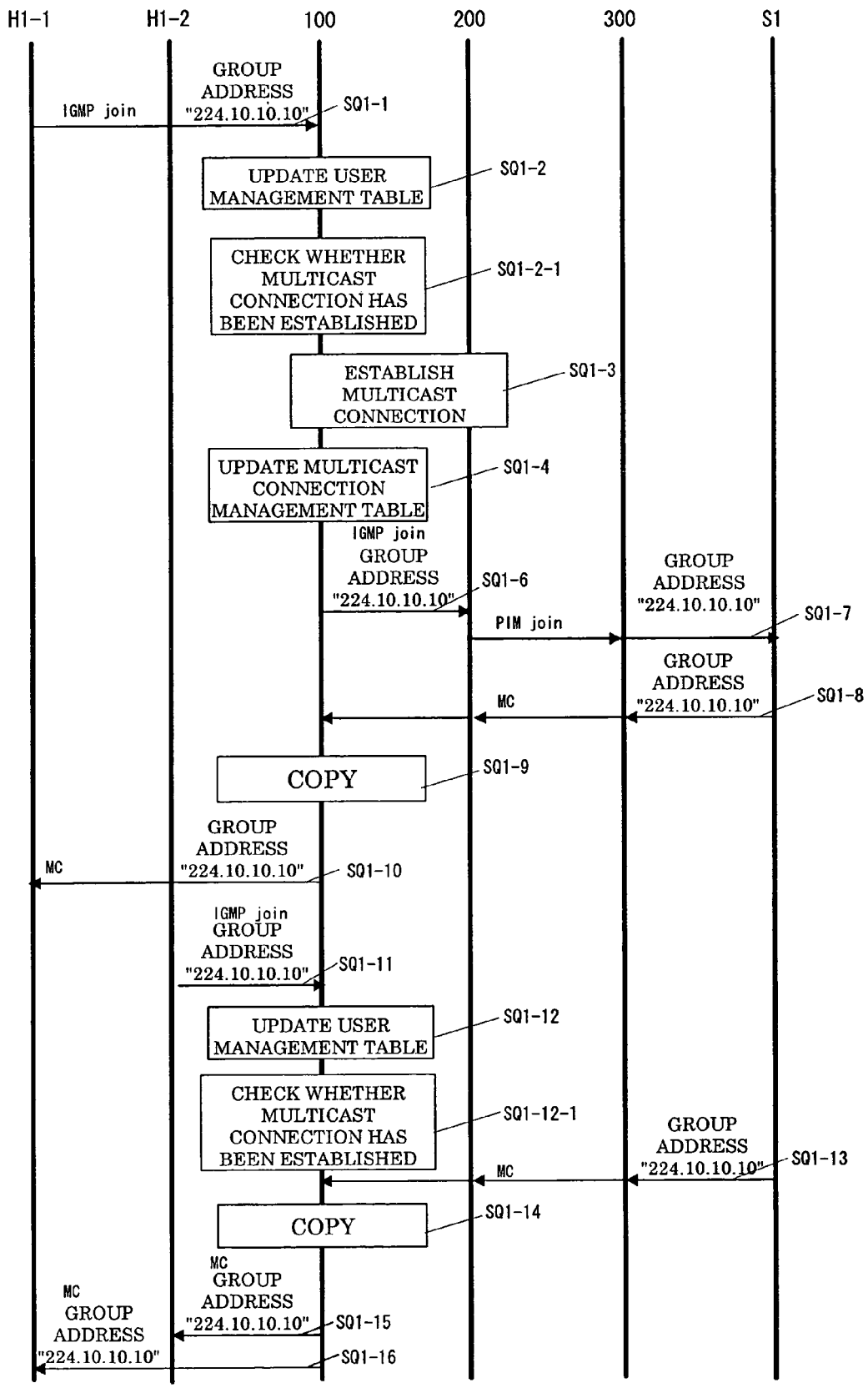
FIG. 11 shows a sequence of joining a multicast group.

FIG. 11 shows a sequence since when the user terminal H1-1 and the user terminal H1-2 indicate their intention to join the multicast group having group address "224.10.10.10" until when the user terminals receive a multicast packet.

Figure 12:
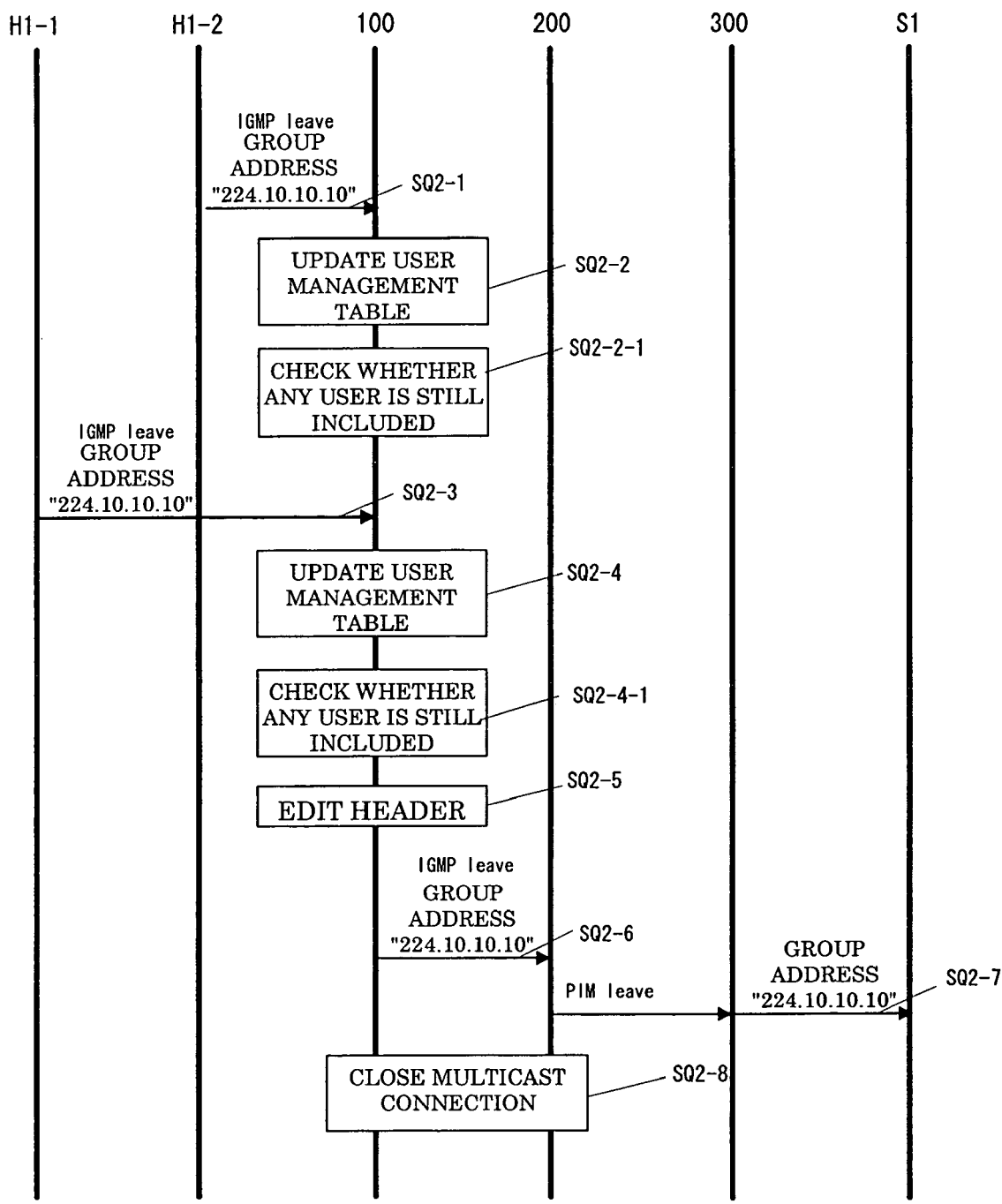
FIG. 12 shows a sequence of leaving the multicast group when the intention to leave is explicitly indicated.

FIG. 12 shows a sequence since when the user terminal H1-1 and the user terminal H1-2 indicate their intention to leave the multicast group having group address "224.10.10.10" until when the multicast packet reception stops.

Figure 13:
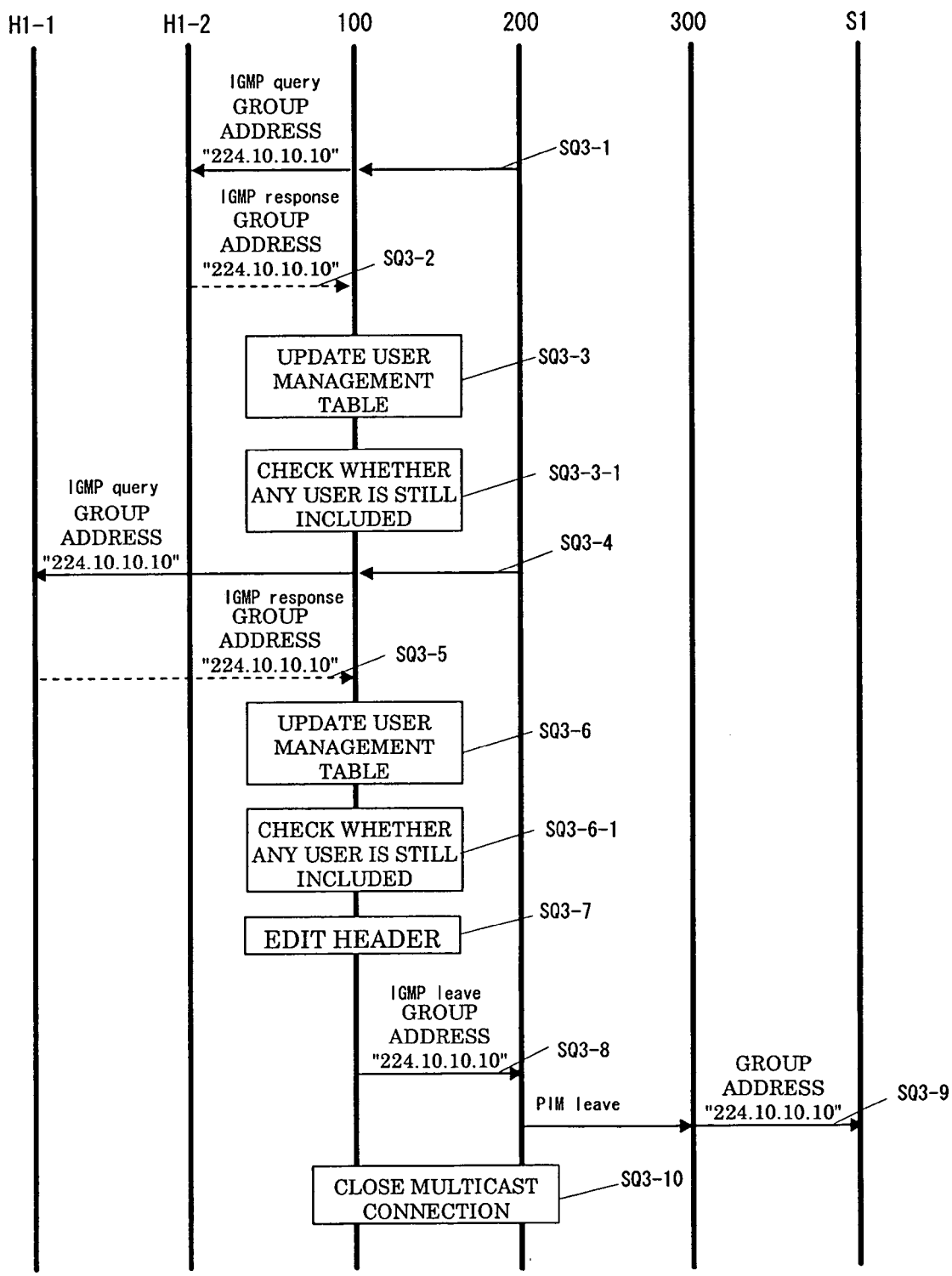
FIG. 13 shows a sequence of leaving a multicast group when the intention to leave is not explicitly indicated.

FIG. 13 shows the operation when the user terminal H1-1 and the user terminal H1-2 leave the multicast group having group address "224.10.10.10", without indicating their intention to leave, because of a terminal failure or others. The figure shows a sequence since when the Layer 2 switch 100 recognizes that the user terminal H1-1 and the user terminal H1-2 have left until when the multicast packet transfer stops.

Figure 14:
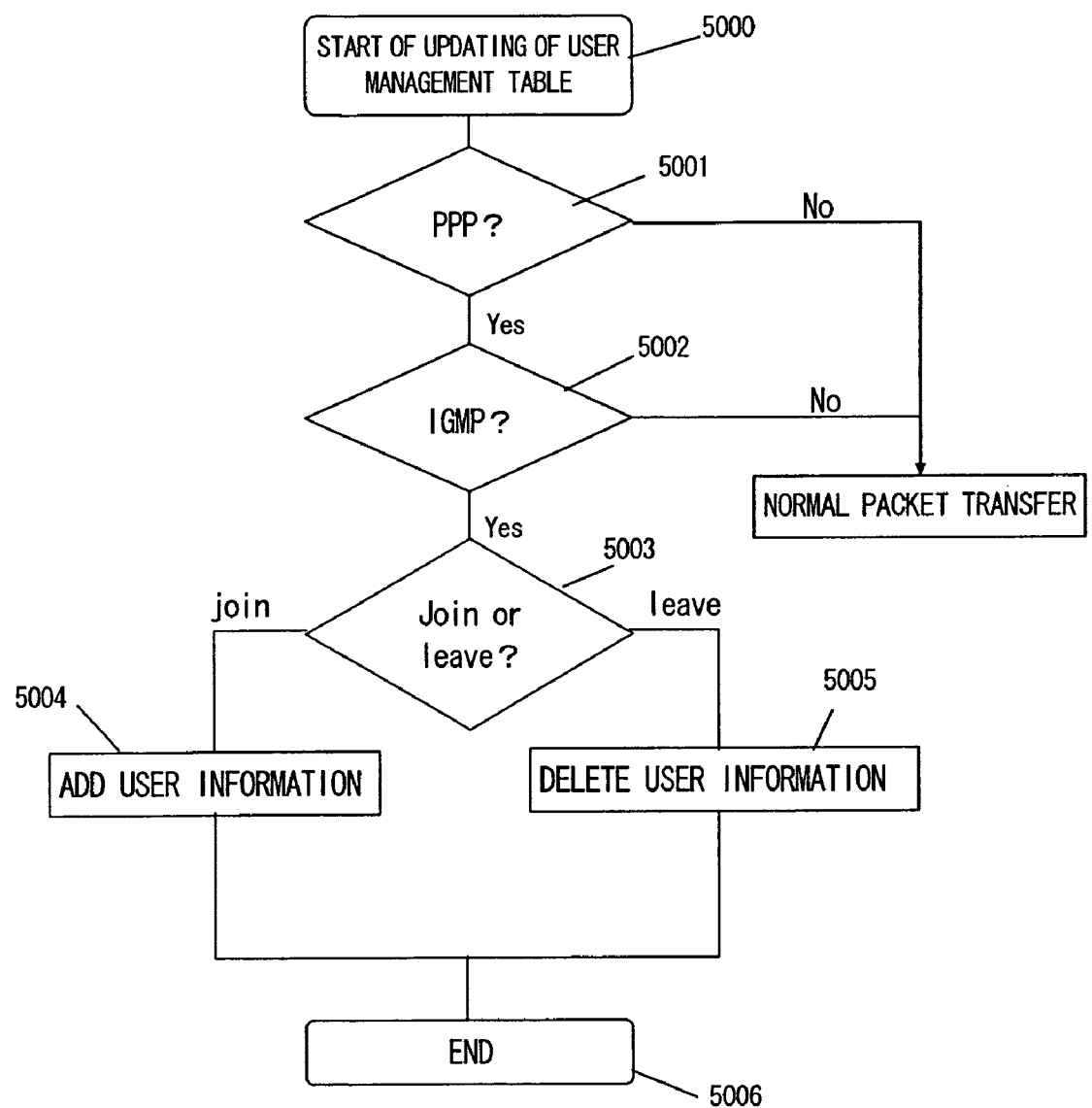
FIG. 14 shows a determination procedure performed when the user management table is updated.
Figure 15:
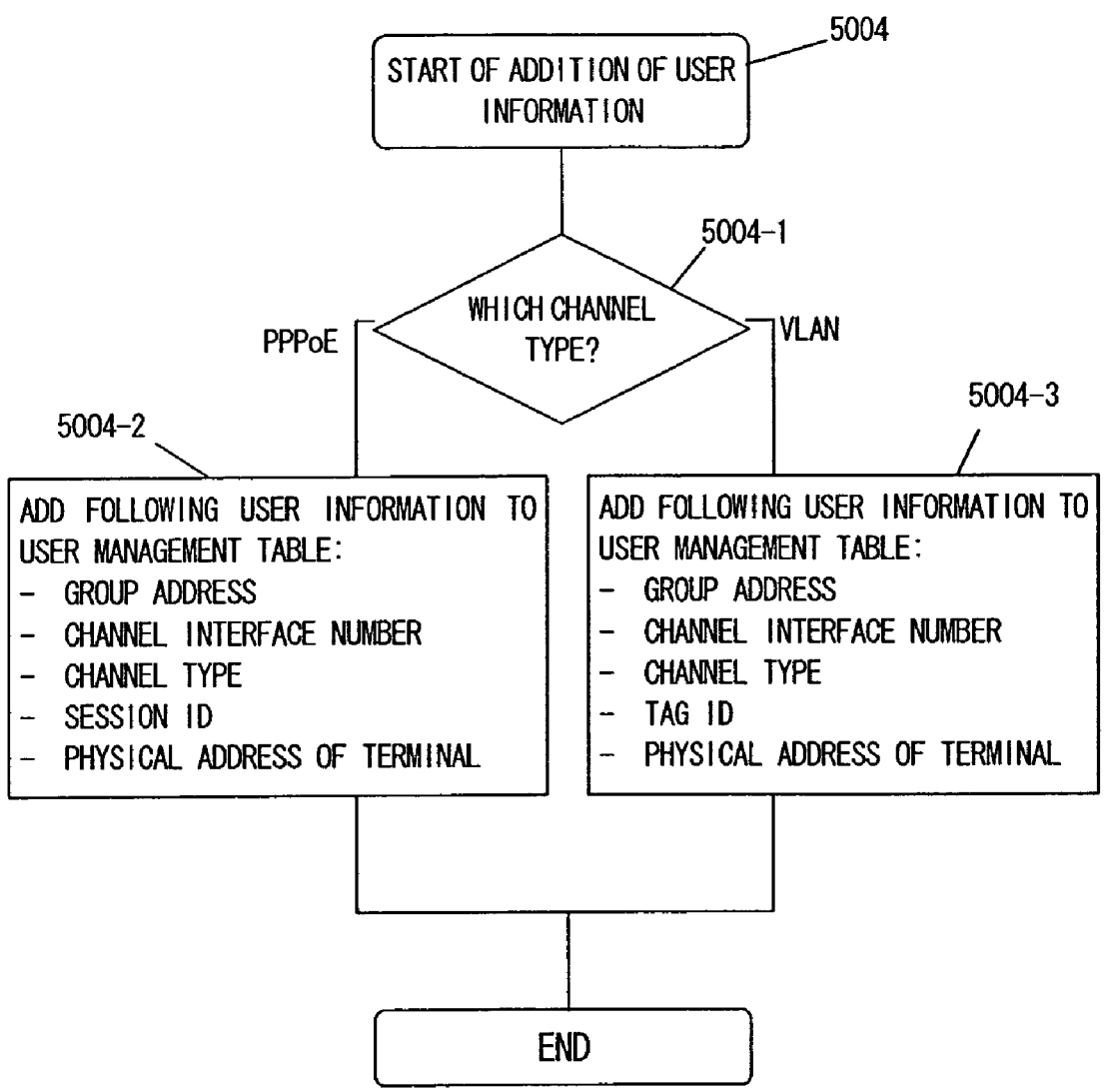
FIG. 15 shows a procedure for updating the user management table.
Figure 16:
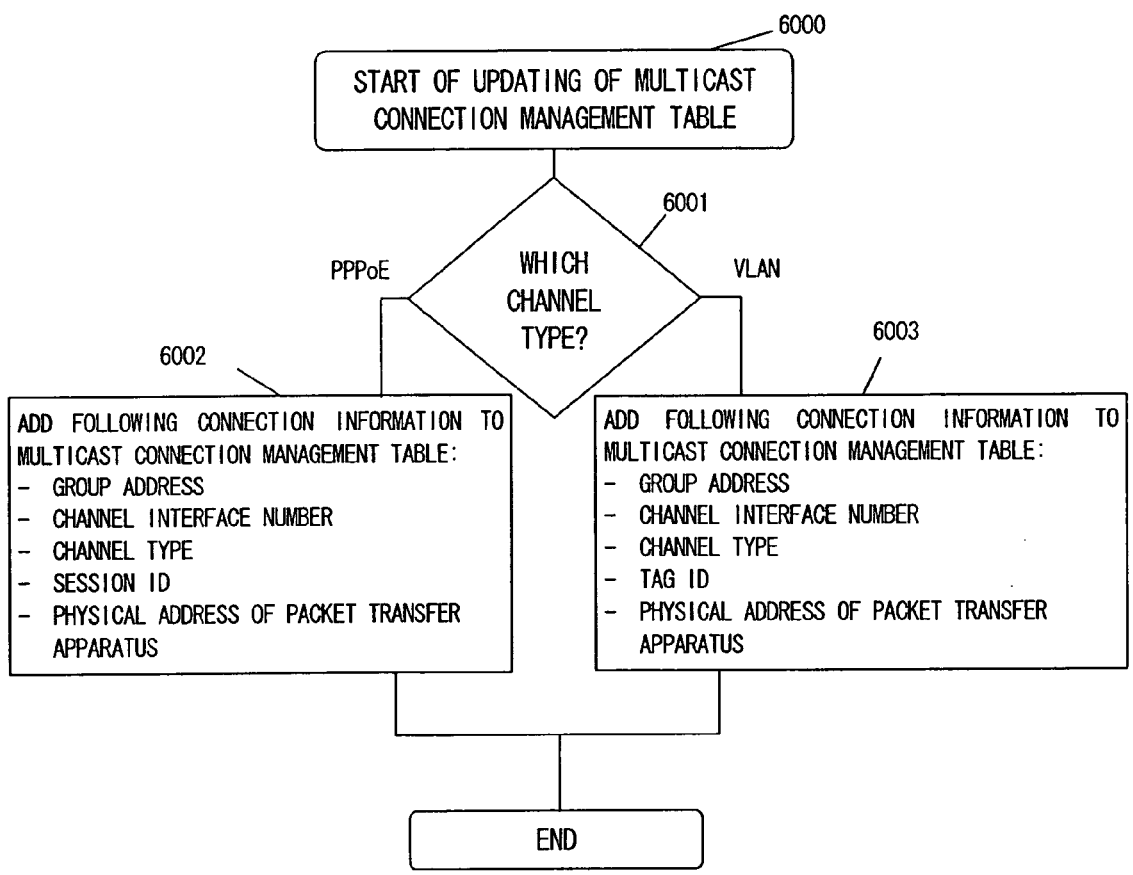
FIG. 16 shows a procedure for updating the multicast connection management table.

FIG. 14 shows a flow chart for adding information to or deleting information from the user management table 100-4-1. FIG. 15 shows a detailed flow chart for adding user information to the user management table 100-4-1. FIG. 16 shows a detailed flow chart for adding multicast connection information to the multicast connection management table 100-4-2.

(Joining a Multicast Group)

The operation of the Layer 2 switch 100 performed when the user terminal H1-1 and the user terminal H1-2 join the content distribution server S1 of the multicast group having group address "224.10.10.10" will be described first with reference to FIG. 11. Suppose that the user terminal H1-1, the user terminal H1-2, and the packet transfer apparatus 200 are connected respectively to channel interface #1 100-1-1, channel interface #2 100-1-2, and channel interface #3 100-1-3, of the Layer 2 switch 100. The user terminal H1-1 wants to join the multicast group having group address "224.10.10.10" and sends an IGMP join packet 600-1 to indicate the intention to join (SQ1-1). The IGMP join packet 600-1 reaches channel interface #1 of the Layer 2 switch 100 and is transferred to the channel interface control block 100-2, which transfers the packet to the reception buffer 100-7-2 and generates an interrupt to notify the processor 100-3 that the packet has been received. The processor 100-3 receives the interrupt, reads the packet from the reception buffer 100-7-2, and updates the user management table accordingly (SQ1-2).

The user management table is updated (SQ1-2) as shown in the flow chart of FIG. 14. The processor 100-3 checks whether the packet read from the reception buffer 100-7-2 is a PPP packet (5001). If not, normal packet transfer is performed. If yes, the processor 100-3 further checks whether the packet is an IGMP packet (5002). If not, normal packet transfer is performed. If yes, the processor 100-3 further checks whether the packet is an IGMP join packet or an IGMP leave packet (5003). If the packet is an IGMP join packet, the user information is added to the user management table 100-4-1 (5004).

The user information is added (5004) as shown in the flow chart of FIG. 15. The processor 100-3 checks the channel type from the received packet (5004-1), takes necessary information successively from the contents of the packet, and stores the information in the user management table 100-4-1. If the channel type is PPPoE, the processor 100-3 takes the group address, the channel interface number, the channel type, the session ID, and the terminal MAC address from the packet and stores them in the group address field 100-4-1-1, the channel interface number field 100-4-1-2, the channel type field 100-4-1-3, the session ID field 100-4-1-4, and the terminal MAC address field 100-4-1-8 of the user management table 100-4-1 (5004-2). This state is shown in FIG. 4. The group address field 100-4-1-1 indicates that the user terminal H1-1 joins the group having group address "224.10.10.10". The channel interface number field 100-4-1-2 indicates that the user terminal H1-1 is connected to channel interface #1 100-1-1 of the Layer 2 switch 100. The table also shows that the channel type is PPPoE, the session ID is 10, and the MAC address of the user terminal H1-1 is 00-00-87-00-00-01.

Back to FIG. 11, after the user table is updated (SQ1-2), the processor 100-3 searches through the multicast connection management table 100-4-2, using group address "224.10.10.10" of the join request as a search key, and checks whether a multicast connection has already been established to the group address (SQ1-2-1). The processor 100-3 can check whether the multicast connection has been established by searching for an entry corresponding to the group address through the multicast connection management table 100-4-2, for instance. If the corresponding multicast connection has not yet been established, the Layer 2 switch 100 establishes a multicast connection 500 to the packet transfer apparatus 200 (SQ1-3). If the corresponding multicast connection has already been established, no new connection is established, that is, the processing of multicast connection establishment (SQ1-3) through a PIM join process (SQ1-7) in FIG. 11 will be skipped. When the multicast connection is established, the Layer 2 switch 100 updates the multicast management table (SQ1-4) by adding the information of the established connection to the multicast connection management table 100-4-2.

The multicast management table is updated as shown in the flow chart of FIG. 16. If the channel type of the established connection is PPPoE, the group address, the channel interface number, the channel type, the session ID, and the MAC address of the packet transfer apparatus are put in the group address field 100-4-2-1, the channel interface number field 100-4-2-2, the channel type field 100-4-2-3, the session ID field 100-4-2-4, and the packet transfer apparatus MAC address field (100-4-2-8) of the multicast connection management table 100-4-2. This state is shown in FIG. 6.

Back to FIG. 11, the Layer 2 switch 100 sends an IGMP join packet to the packet transfer apparatus 200 on behalf of the user terminal H1-1 (SQ1-6). The packet transfer apparatus 200 sends a PIM join packet through the router 300 to the content distribution server S1 (SQ1-7). Then, the content distribution server S1 starts distributing a multicast packet through the router 300 to the packet transfer apparatus 200. The packet transfer apparatus 200 transfers a multicast packet 600-4 through a multicast connection 500 to the Layer 2 switch 100 (SQ1-8). The multicast packet reaches channel interface #3 100-1-3 of the Layer 2 switch 100 and is transferred to the channel interface control block 100-2. The channel interface control block 100-2 stores the received multicast packet in the reception buffer 100-7-2 and notifies the processor 100-3 that the packet has been received. The processor 100-3 searches through the multicast connection management table 100-4-2 by using as keys the group address, the session ID, and the transmission source MAC address stored respectively in the IP DA field 705, and the PPPoE field 702, and the MAC SA field (701) of the received packet. If a connection of exact matching is found, the user management table 100-4-1 is further searched through, by using the group address as a search key. The user management table 100-4-1 contains the data of a single user terminal in this state, as shown in FIG. 4. If the group address of the received multicast packet is "224.10.10.10", the received multicast packet is transferred to a user terminal having terminal MAC address "00-00-87-00-00-01", that is, the terminal H1-1. In the meantime, the processor 100-3 edits the header information of the received multicast packet.

The multicast packet 600-4 received from the packet transfer apparatus 200 is configured as shown in FIG. 8. The MAC DA field 700 holds MAC address "00-00-87-33-33-33" assigned to channel interface #3 100-1-3 of the Layer 2 switch to which the multicast connection is made; the MAC SA field 701 holds MAC address "00-00-87-00-00-10" assigned to the packet transfer apparatus 200 from which the multicast connection is made; the PPPoE header field 701 holds session ID "30" of the multicast connection 500; and the IP DA field 705 holds group IP address "224.10.10.10" of the transmission destination.

To transfer the packet to the user terminal H1-1, the processor 100-3 obtains the transmission destination MAC address and the ID of the session between the user terminal H1-1 and the Layer 2 switch 100, from the terminal MAC address field 100-4-1-8 and the session ID field 100-4-1-4 of the user management table 100-4-1, and replaces the corresponding items of the multicast packet received from the packet transfer apparatus with these items. MAC address "00-00-87-11-11-11" assigned to the channel interface 100-1-1 connected to the user terminal H1-1 is held in the MAC SA field 701. This state is shown in FIG. 9.

The processor 100-3 stores the created multicast packet 600-6 in the transmission buffer 100-7-1 and activates the channel interface control block 100-2. The channel interface control block 100-2 takes out the packet from the transmission buffer 100-7-1 and sends the multicast packet 600-6 through channel interface #1 100-1-1 to the user terminal H1-1 (SQ1-10). Now, the user terminal H1-1 receives a multicast packet from the content distribution server S1.

Suppose that the user terminal H1-2 indicates its intention to join the group having group address "224.10.10.10" by sending an IGMP join packet 600-2 to the Layer 2 switch 100 (SQ1-11). The IGMP join packet 600-2 reaches channel interface #2 of the Layer 2 switch 100 and is transferred to the channel interface control block 100-2, which transfers the received packet to the reception buffer 100-7-2 and generates an interrupt to notify the processor 100-3 that the packet has been received. The processor 100-3 receives the interrupt, reads the packet from the reception buffer 100-7-2, and updates the user management table (SQ10-12).

The user management table is updated (SQ10-12) in the same way as described above, as shown in the flow chart of FIG. 14. The processor 100-3 checks whether the packet read from the reception buffer 100-7-2 is a PPP packet (5001). If not, normal packet transfer is performed. If yes, the processor 100-3 further checks whether the packet is an IGMP packet (5002). If not, normal packet transfer is performed. If yes, the processor 100-3 further checks whether the packet is an IGMP join packet or an IGMP leave packet (5003). If an IGMP join packet is received, user information is added to the user management table 100-4-1 (5004).

The user information is added (5004) in the same way as described above, as shown in the flow chart of FIG. 15. The channel type is judged from the received packet (5004-1), and necessary information is successively taken from the contents of the packet and stored in the user management table 100-4-1. If the channel type is PPPoE, the processor 100-3 takes the group address, the channel interface number, the channel type, the session ID, and the terminal MAC address from the packet, and puts the items in the group address field 100-4-1-1, the channel interface number field 100-4-1-2, the channel type field 100-4-1-3, the tag ID field 100-4-1-7, and the terminal MAC address field 100-4-1-8 of the user management table 100-4-1 (5004-2). This state is shown in FIG. 5.

In the shown example, the user terminal H1-2 has MAC address "00-00-87-00-00-02"; the channel type is PPPoE; the session ID is 20; a connection is made to channel interface #2 of the Layer 2 switch 100; and a request to join the multicast group having group address "224.10.10.10" is made. After the user management table is updated (SQ1-12), the multicast connection management table 100-4-2 is searched through by using the group address as a search key, and whether a multicast connection has already been established is checked (SQ1-12-1).

The user terminal H1-1 has already joined the multicast group having group address "224.10.10.10", and the Layer 2 switch 100 has already received a multicast packet of the multicast group from the content distribution server S1, as shown in FIG. 5. Accordingly, the Layer 2 switch 100 does not make a new multicast connection 500 and does not send a new IGMP join packet to the packet transfer apparatus 200.

Back to FIG. 11, suppose that the Layer 2 switch 100 now receives a multicast packet of group address "224.10.10.10" from the content distribution server S1 (SQ1-13). As described above, the multicast packet reaches channel interface #3 100-1-3 of the Layer 2 switch 100 and is transferred to the channel interface control block 100-2, which stores the multicast packet in the reception buffer 100-7-2 and generates an interrupt to notify the processor 100-3 that a multicast packet has been received. The processor 100-3 searches through the multicast connection management table 100-4-2 by using as keys the group address, the session ID, and the transmission source MAC address stored respectively in the IP DA field 705, the PPPoE field 702, and the MAC SA field 701 of the received packet. If a connection of exact matching is found, the user management table 100-4-1 is searched through, by using the group address as a key. Because two user terminals join the group having group address "224.10.10.10", as shown in FIG. 5, the Layer 2 switch 100 copies the multicast packet (SQ1-14) and transfers the copied multicast packet to the user terminal H1-1 and the user terminal H1-2 (SQ1-15 and SQ1-16). The packet is edited as when the packet is transferred to the user terminal H1-1, which is described earlier. An example of a packet transferred to the user terminal H1-2 is shown in FIG. 10. When the edited packets are transferred to the user terminal H1-1 and the user terminal H1-2, the user terminals can receive a multicast packet.

(Case 1 of Leaving a Multicast Group)

The operation of the Layer 2 switch performed when a user terminal leaves a multicast group will next be described. The sequence of leaving a multicast group depends on whether the user terminal makes a request of leaving explicitly or not. The user terminal is assumed not to make a request of leaving explicitly when the user terminal becomes out of order, for instance.

FIG. 12 shows a sequence in which the user terminal H1-1 and the user terminal H1-2 make a request of leaving explicitly.

The user terminal H1-2 wants to leave the multicast group with group address "224.10.10.10" and indicates the intention to leave by sending an IGMP leave packet (SQ2-1). The IGMP leave packet reaches channel interface #2 of the Layer 2 switch 100 and is transferred to the channel interface control block 100-2, which transfers the packet to the reception buffer 100-7-2 and generates an interrupt to notify the processor 100-3 that the packet has been received. The processor 100-3 receives the interrupt, reads the packet from the reception buffer 100-7-2, and updates the user management table (SQ2-2).

The user management table is updated (SQ2-2) as shown in the flowchart of FIG. 14. The processor 100-3 checks whether the packet read from the reception buffer 100-7-2 is a PPP packet (5001). If not, normal packet transfer is performed. If yes, the processor 100-3 further checks whether the packet is an IGMP packet (5002). If not, normal packet transfer is performed. If yes, the processor 100-3 further checks whether the packet is an IGMP join packet or an IGMP leave packet (5003). If the packet is an IGMP leave packet, the user information is deleted from the user management table 100-4-1 (5005). To delete the user information (5005), the processor 100-3 takes the channel type from the contents of the received IGMP leave packet. If the channel type is PPPoE, the session ID, the terminal MAC address, and the group address are also taken. The processor 100-3 searches through the user management table 100-4-1 by using the taken information as a key, and deletes the corresponding user terminal information. After the user terminal information is deleted from the user management table 100-4-1, the user management table 100-4-1 is searched through by using the group address as a key, and it is checked whether any user still belongs to the corresponding group (SQ2-2-1). If any user is found, the multicast connection corresponding to the group address is kept. The state after the user information of the user terminal H1-2 is deleted is shown in FIG. 4. The figure shows that a user terminal still belongs to the group with group address "224.10.10.10", so that the multicast connection for the group address is held as shown in FIG. 6.

If the Layer 2 switch 100 now receives a multicast packet of group address "224.10.10.10" from the content distribution server S1, the Layer 2 switch 100 does not transfer the multicast packet to the user terminal H1-2 and transfers the packet just to the user terminal H1-1 contained in the user management table 100-4-1.

Back to FIG. 12, the user terminal H1-1 then sends an IGMP leave packet to indicate the intention to leave (SQ2-3). The IGMP leave packet reaches channel interface #1 of the Layer 2 switch 100 and is transferred to the channel interface control block 100-2, which transfers the packet to the reception buffer 100-7-2 and generates an interrupt to notify the processor 100-3 that the packet has been received. The processor 100-3 receives the interrupt, reads the packet from the reception buffer 100-7-2, and updates the user management table (SQ2-4).

The user management table is updated (SQ2-4) as shown in the flow chart of FIG. 14. The processor 100-3 checks whether the packet received from the reception buffer 100-7-2 is a PPP packet (5001). If not, normal packet transfer is performed. If yes, the processor 100-3 further checks whether the received packet is an IGMP packet (5002). If not, normal packet transfer is performed. If yes, the processor 100-3 further checks whether the packet is an IGMP join packet or an IGMP leave packet (5003). If the packet is an IGMP leave packet, the user information is deleted from the user management table 100-4-1 (5005). To delete the user information (5005), the processor 100-3 first takes the channel type from the contents of the IGMP leave packet. If the channel type is PPPoE, the session ID, the terminal MAC address, and the group address are also taken. The processor 100-3 searches through the user management table 100-4-1 by using the taken information as a key, and deletes the corresponding user terminal information. After the user terminal information is deleted from the user management table 100-4-1, the user management table 100-4-1 is searched through by using the group address as a key, and it is checked whether any user still belongs to the group (SQ2-4-1). Because both the user terminal H1-1 and the user terminal H1-2 have left the multicast group, the user management table 100-4-1 indicates that no user belongs to the group with group address "224.10.10.10".

Back to FIG. 12, the Layer 2 switch 100 sends an IGMP leave packet to the packet transfer apparatus 200 in order to stop multicast packet reception from the content distribution server S1 (SQ2-6). The packet transfer apparatus 200 receives the IGMP leave packet and sends a PIM leave packet through the router 300 to the content distribution server (SQ2-7). The content distribution server S1 receives the PIM leave packet and stops multicast packet distribution to the Layer 2 switch 100.

Now, the multicast packet distribution to the user terminal H1-1 and the user terminal H1-2 stops. Because the multicast connection to the group with group address "224.10.10.10" becomes unnecessary, the connection is closed (SQ2-8). The corresponding connection information is deleted from the multicast connection management table 100-4-2.

(Case 2 of Leaving a Multicast Group)

FIG. 13 shows a sequence of stopping distribution from the content distribution server S1 when the user terminal H1-1 and the user terminal H1-2 leave the multicast group with group address "224.10.10.10", without indicating their intention to leave explicitly, such as when a user terminal failure occurs.

The Layer 2 switch 100 sends an IGMP query packet to the user terminals included in the user management table 100-4-1 successively in order to check whether they are connected (SQ3-1). If the user terminal H1-2 operates normally, the user terminal H1-2 returns an IGMP response packet (SQ3-2). If no response is returned, the Layer 2 switch 100 considers that the user terminal H1-2 is not connected and deletes the user information of the user terminal H1-2 from the user management table 100-4-1 (SQ3-3). After the user terminal information is deleted from the user management table 100-4-1, the user management table 100-4-1 is searched through by using the group address as a key and it is checked whether any user still belongs to the group (SQ3-3-1). If any user still belongs to the group, the multicast connection corresponding to the group address is kept. The Layer 2 switch 100 sends an IGMP query packet to the user terminal H1-1 as well (SQ3-4). If an IGMP response packet is not returned, the Layer 2 switch 100 considers that the user terminal H1-1 is not connected and deletes the user information of the user terminal H1-1 from the user management table 100-4-1 (SQ3-6). After the user terminal information is deleted from the user management table 100-4-1, the user management table 100-4-1 is searched through by using the group address as a key, and it is checked whether any user still belongs to the group (SQ3-6-1). Because both the user terminal H1-1 and the user terminal H1-2 have already left the multicast group, the user management table 100-4-1 contains no user information, in this example.

Accordingly, the Layer 2 switch 100 edits the header of an IGMP leave packet including the group address "224.10.10.10" (SQ3-7), so that multicast packet distribution from the content distribution server S1 will be stopped. The Layer 2 switch 100 sends the IGMP leave packet to the packet transfer apparatus 200 (SQ3-8). The packet transfer apparatus 200 receives the IGMP leave packet and sends a PIM leave packet through the router 300 to the content distribution server (SQ3-9). The content distribution server S1 receives the PIM leave packet and stops multicast packet distribution to the Layer 2 switch 100.

Now, the multicast packet distribution to the user terminal H1-1 and the user terminal H1-2 stops. Because a multicast connection to the group with group address "224.10.10.10" becomes unnecessary, the connection is closed (SQ3-10). The corresponding connection information is deleted from the multicast connection management table 100-4-2.

The embodiment controlled by software has been described. The processing of the present invention may also be implemented by hardware. PPPoE has been mainly described above, but the embodiment can also be applied to a point-to-point connection by VLAN, PPPoA, PPPoEoA, and others.

What is claimed is:

1. A Layer 2 switch disposed between a user terminal and a packet transfer apparatus, for passing a packet, the Layer 2 switch comprising:

a user management table for storing an address of a multicast group which the user terminal is going to join, a channel interface number connected to the user terminal, and a MAC address of the user terminal;

a multicast connection management table for storing a channel interface number of a multicast connection to be made to the packet transfer apparatus and a MAC address of the packet transfer apparatus, corresponding to an address of a multicast group which the user terminal is going to join;

a channel interface connected to a network; and a processor which has access to each of the tables and transfers a multicast packet between the user terminal and the packet transfer apparatus through the channel interface;

the processor comprising:

a means for receiving a packet of a multicast reception request message for joining a multicast group having a multicast group address, from a user terminal desiring to receive a multicast packet through the channel interface;

a means for terminating the received packet without transferring the packet to the packet transfer apparatus of high-level if it is judged from the header or the data portion that the packet from a user terminal contains a multicast reception request message;

a means for determining whether a multicast connection has already been made, in accordance with a multicast group address obtained from the received multicast reception request message, with reference to the multicast connection management table;

a means for adding a multicast group address and a channel interface number and a MAC address of a user terminal from which the multicast reception request message is sent, if the multicast reception connection has already been made;

a means for receiving a multicast packet from the packet transfer apparatus and determining whether the multicast packet is received through the multicast connection, with reference to the multicast connection management table, in accordance with a multicast group address and a transmission source MAC address included in the received packet;

a means for referencing the user management table in accordance with a group address included in the received packet, if the received packet is determined as being a multicast packet; and a means for copying the multicast packet for each contained user terminal while obtaining the information of a channel interface to each user terminal from the user management table, and distributing the multicast packet to each user terminal, if the user management table contains the information of a user terminal joining a group having the same group address as included in the received packet.

2. A Layer 2 switch according to claim 1, further comprising:

a means for creating a new multicast connection corresponding to the received multicast group address if it is determined that no multicast connection has been made; and a means for adding a multicast group address, a channel interface number, and a packet transfer apparatus MAC address of a newly created multicast connection to the multicast connection management table.

3. A Layer 2 switch according to claim 1, further comprising:

a means for determining whether a packet received from a user terminal contains a multicast packet reception request message if the user terminal joins a multicast group, and terminating a packet containing a multicast packet reception request message without transferring the packet; and a means for adding a multicast group address, and a channel interface number and a MAC address of a user terminal sending the multicast request message, included in a received packet, to the user management table.

4. A Layer 2 switch according to claim 1, further comprising:

a means for determining whether a packet received from a user terminal contains a multicast leave message, and, if it is determined that the packet contains a multicast leave message, for not transferring but terminating the packet; and a means for deleting an entry of the user terminal from the user management table.

5. A Layer 2 switch according to claim 4, wherein the user management table is searched through in accordance with the multicast group address from which the user terminal left, it is checked whether any user terminal still belongs to the multicast group, and the corresponding multicast connection is kept if any user terminal belonging to the multicast group is found.

6. A Layer 2 switch according to claim 4, further comprising:

a means for searching through the user management table in accordance with the multicast group address from which the user terminal left, determining whether any user terminal still belongs to the multicast group, and sending a multicast leave message to leave the multicast group to the packet transfer apparatus if any user belonging to the group is not found; and a means for closing the multicast connection.

7. A Layer 2 switch according to claim 1, further comprising:

a means for transferring a multicast reception query packet to each user terminal where the packet transfer apparatus or the Layer 2 switch checks whether there is a user terminal desiring to receive a multicast packet; and a means for deleting the entry of a user terminal which does not respond, from the user management table.

8. A Layer 2 switch according to claim 1, wherein one dynamic or static multicast connection is made to each multicast group address to which a plurality of user terminals join, and multicast packet transfer routes are collected, in accordance with the multicast connection management table.

* * * * *